Feb. 6, 1951        W. M. ROBERDS        2,540,913
ELECTRICAL CONDENSER
Original Filed June 15, 1943
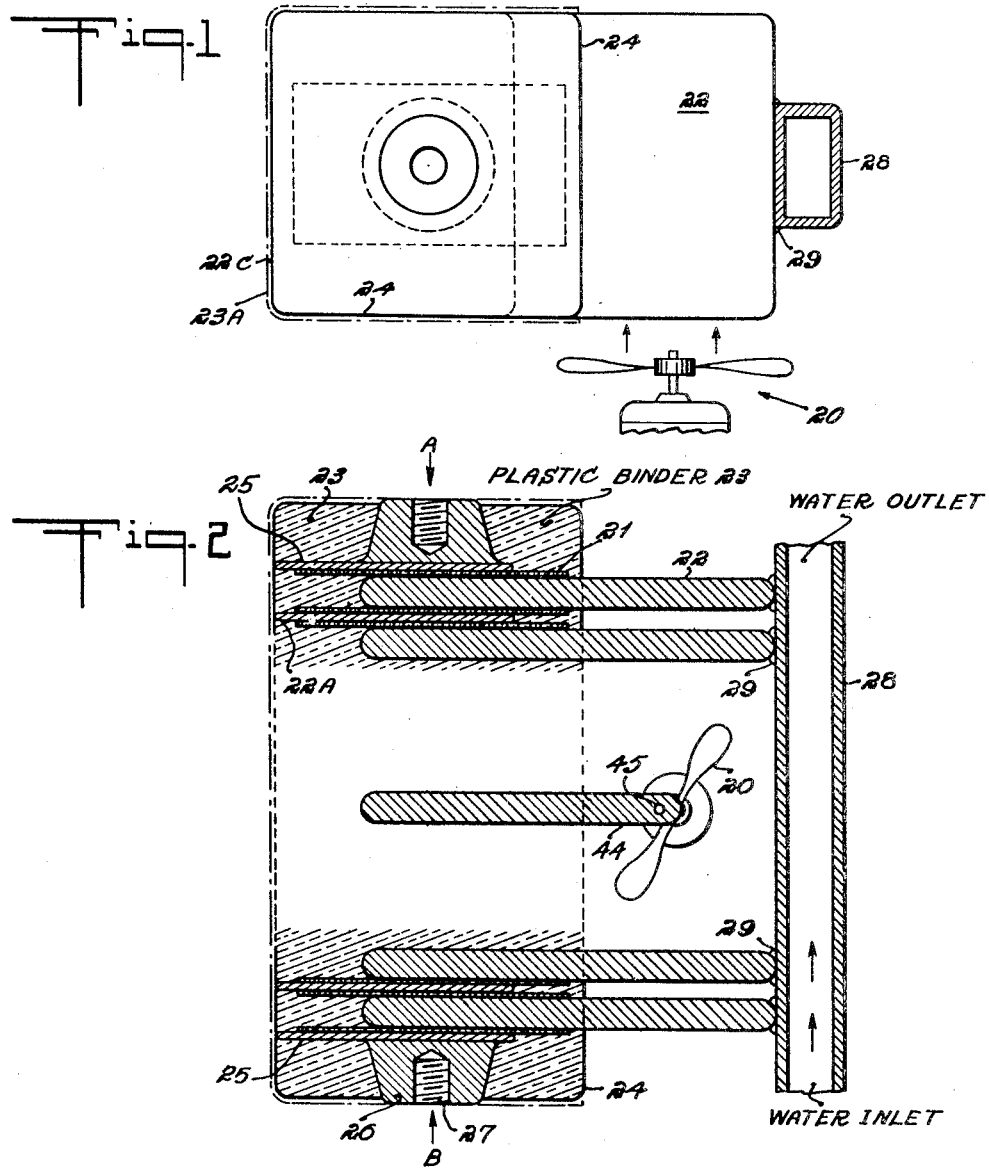
INVENTOR.
Wesley M. Roberds
BY
ATTORNEY.

Patented Feb. 6, 1951

2,540,913

UNITED STATES PATENT OFFICE 2,540,913

ELECTRICAL CONDENSER

Wesley M. Roberds, Fort Worth, Tex., assignor to Radio Corporation of America, a corporation of Delaware Original application June 15, 1943, Serial No. 490,851. Divided and this application October 24, 1946, Serial No. 705,469

1 Claim. (Cl. 175—41)

This invention relates to new and useful improvements in electrical condensers, and is particularly directed to condensers of the type having a solid dielectric and arranged for carrying extremely heavy current loads.

This application is a division of my copending application Serial No. 490,851, filed June 15, 1943, now Patent No. 2,460,033.

An object of this invention is to provide a condenser which is efficient in use and economical to manufacture.

Another object of this invention is to provide a condenser which will carry extremely heavy electrical current loads in an efficient manner without unduly increasing the volume and cost of the condenser over the devices which carry a normal or lesser current load.

Still another object of this invention is to provide a simple light weight combined air and water cooled condenser structure in which the electrodes and dielectrics are bound together by plastic insulation.

A feature of this invention is the novel arrangement of a solid dielectric or mica sheet and adjacent electrodes which extend substantially beyond the dielectric in such a manner as to efficiently carry away heat developed in the central portion of the condenser.

This invention is a further improvement over condensers of the type shown and described in Pickard United States Patent No. 1,918,825.

In the condensers of the prior art, when such devices were intended to carry extremely heavy electrical current loads, expensive and complicated cooling apparatus have been provided.

It is a purpose of this invention to simplify the structural arrangement and cooling of the prior art condensers by arranging the mica sheets with alternately projecting metallic members which serve as electrode and cooling vanes. By alternately arranging the maximum projection of the vanes a metallic cooling duct can be fastened for the passage of a cooling fluid.

It has been found that the losses in a high frequency condenser, which is capable of carrying extremely heavy current loads, are a direct function of the normal temperature of the active dielectric members under the working load conditions. The breakdown in high frequency condensers almost invariably occurs not in the mica but in the oil, wax or other surrounding dielectric medium and at a voltage less than the breakdown strength of the mica. Therefore, if the temperature of the dielectric can be kept low, the condenser losses will likewise be low. By the arrangement of this condenser, the thermal path is arranged to give maximum cooling to the dielectric members.

The condensers of this invention are very useful in very high frequencies (for example above 10 megacycles) where overheating is generally the limiting factor.

This invention will be described in more detail by the accompanying drawings, in which:

Fig. 1 is a plan view of a condenser of this invention in which the dielectric sheets and metallic electrodes are bound together solely by a plastic binder;

Fig. 2 is a longitudinal sectional view of Fig. 1; and

Fig. 3 is a circuit diagram showing the terminal arrangement of the condenser of Figs. 1 and 2.

Referring now in detail to Figs. 1 and 2 of the drawings, the condenser of this invention is particularly adapted for direct air cooling; the cooling of the electrodes, or projecting radiators being accomplished by means of a direct air blast from an electric fan or blower 20, and also by circulating water or oil through tubes 28. The dielectric sheets 21 are located between the heavy projecting metallic electrodes 22 which are alternately assembled with the thin metallic electrodes 22A and located on each side of the dielectric sheets 21. In assembling the members 21, 22 and 22A the stack is placed in a vertical position, temporarily clamped, and then vacuum treated with molten wax in this position so that the dielectric sheets 21 and metallic electrodes 22 and 22A will not move when the wax solidifies. The stack is then taken from the vacuum treatment chamber and the clamp removed. A thin metallic temporary container 22C (such as, for example, a tin can, whose outline is shown by the dot and dash lines 23A) is provided for molding the plastic binder 23. The entire stack of metallic electrodes and mica sheets are placed within the container 22C so that the heavy metallic electrodes 22 project beyond the end of the temporary container. A temporary clamp is located on the outside of the container and pressure is applied to the sides of the thin walled metallic container at points A, B, indicated by the arrows. A liquid plastic, such as, for example, styrene, is then poured in the container until it overflows at the top as is indicated at 24. The entire unit is then placed in an oven and heat is applied to polymerize or solidify the styrol, changing it to a solid mass of polystyrol. While the styrol is being polymerized, the entire stack is cooled by circulating a cooling fluid (such as water or oil) through a cooling pipe 28 which is soldered in place to the ends of metallic electrodes 22, the points of soldering being indicated at 29. The polystyrene will first harden about the metal parts, then about the mica, and last at the outer side of the block. This prevents the setting up of strains which will leave voids and cracks in the insulating plastic block. The entire unit remains in the oven until the plastic insulating binder 23 is suitably solidified and changed to a polystyrol. The temporary clamp is removed and the sides of the thin metallic container are cut away from the condenser unit. It will be noted that the shape of the temporary container is such that the plastic binder entirely surrounds the dielectric sheets 21 and metallic electrodes 22 and 22A but permits the projection of electrodes 22 substantially beyond the binder at one end of the unit, thereby permitting the passage of an airblast to circulate around the heavy copper plates from the blower 29 to cool the condenser.

The end electrodes 25 are provided with projecting metallic terminal portions 26 which are threaded at 27 to serve as external electrical connections. If desired, a central connection may be made by substituting a shorter plate 44 for one of the thick electrodes 22 which is located in the center of the stack. The electrode 44 may be provided with an aperture 45 in which an electrical connection or wire may be inserted. The cooling of this condenser may be accomplished by having both an airblast on the end of the plates 22 and by circulating a fluid such as water or oil through tube 28 from any suitable source (not shown). The fluid tube 28 also may serve as an electrical connection for the projecting electrodes. This type of plastic binder condenser is particularly useful where the weight of the condenser must be kept at a minimum, such as in aircraft.

The circuit arrangement of the condenser terminals of the condenser of Figs. 1 and 2 is shown by Fig. 3 wherein the outer electrodes 25 are connected directly to terminals 42 and 43, and the heavy electrodes 22 are connected together by tube 28, although it should be understood that any other circuit arrangement can be employed, such as, for example, by having the central electrode 44 provided with a midpoint terminal 45.

While I have indicated and described a system for carrying my invention into effect, it will be apparent to one skilled in the art that my invention is by no means limited to the particular devices or circuits shown and described, but that many modifications may be made without departing from the scope of my invention.

What is claimed is:

An electric condenser comprising a plurality of interposed solid dielectric sheets and conductive electrodes, said electrodes being of greater area than said dielectric sheets, said electrodes being alternately arranged to extend substantially beyond three edges of said solid dielectric sheets to provide cooling radiation therefor, some of the electrodes being of greater length and thickness than others of said electrodes, terminal electrodes located at each end of said condenser having threaded projecting portions which are located substantially in the normal central plane of said dielectric sheets, a rectangular fluid cooling duct in thermal contact with the electrodes of greater length, and plastic binding means surrounding the entire portion of said dielectric sheets and three edges of said conductive electrodes to bind them together to form a unitary condenser structure, the forth edge of said some electrodes being permitted to project beyond the plastic for cooling.

WESLEY M. ROBERDS.

REFERENCES CITED

The following references are of record in the file of this patent:

UNITED STATES PATENTS

| Number | Name | Date |
| --- | --- | --- |
| 1,391,672 | Dubilier | Sept. 27, 1921 |
| 1,918,825 | Pickard | July 18, 1933 |
| 2,206,720 | Ducati | July 2, 1940 |
| 2,414,525 | Hill | Jan. 21, 1947 |

FOREIGN PATENTS

| Number | Country | Date |
| --- | --- | --- |
| 335,829 | Great Britain | Oct. 2, 1930 |
| 395,420 | Great Britain | July 20, 1933 |